UNITED STATES PATENT OFFICE.

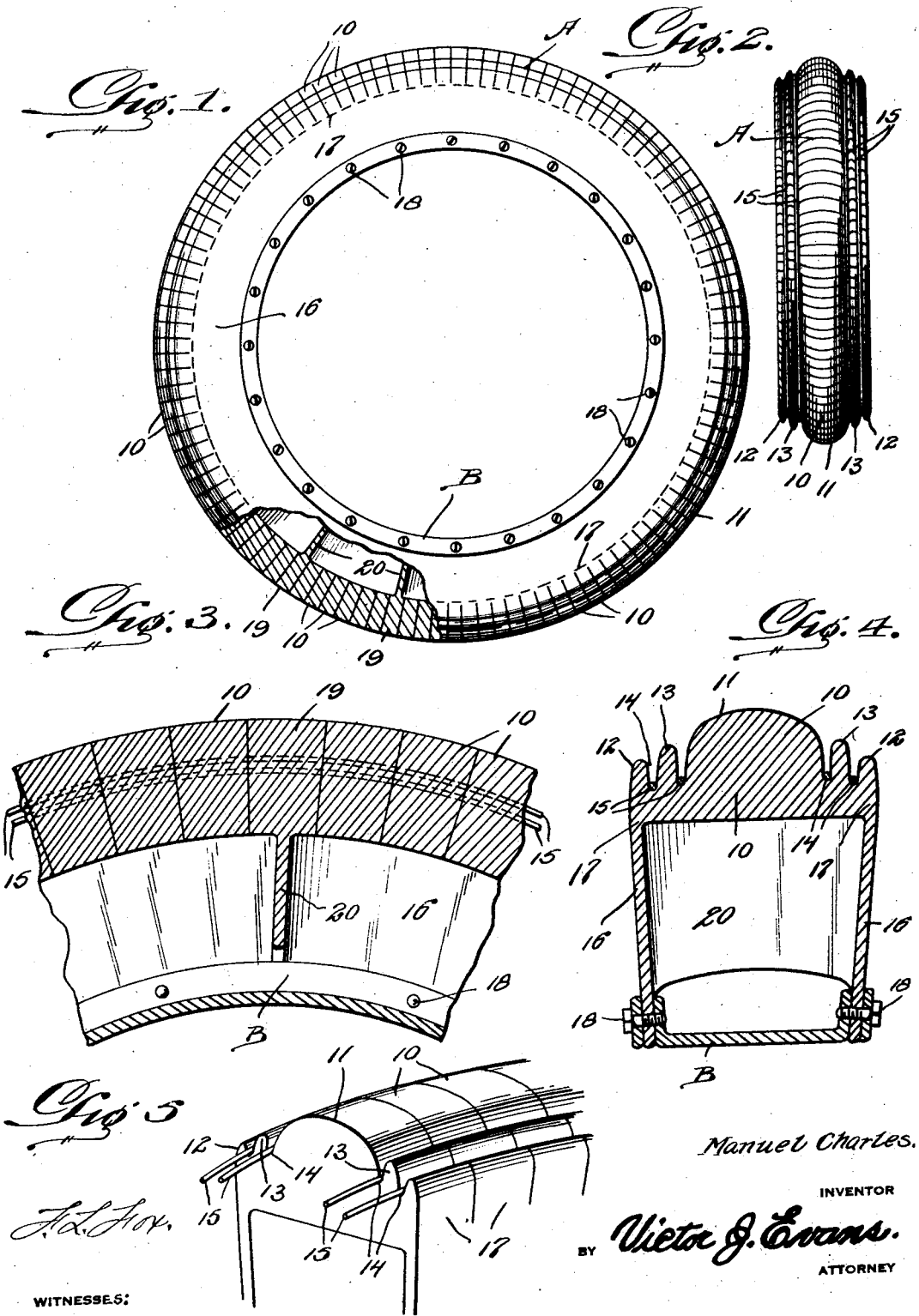

MANUEL CHARLES, OF MEXICO, MEXICO.

TIRE.

1,406,151.　　　Specification of Letters Patent.　　Patented Feb. 7, 1922.

Application filed April 15, 1921. Serial No. 461,590.

*To all whom it may concern:*

Be it known that I, MANUEL CHARLES, a citizen of Mexico, residing at Mexico city, Mexico, have invented new and useful Improvements in Tires, of which the following is a specification.

This invention comprehends the provision of a tire, as well as a new and improved method of constructing a tire wherein the side walls of the tire provide the desired resiliency and cushioning effect, making it possible to eliminate use of a pneumatic tube or any substitute therefor.

More specifically stated, the tire is made up of a plurality of units arranged in face to face contact and subsequently secured together by means of tires which also serve to compress the units to afford a relatively hard tread, the sides of the tire being vulcanized to the tread portion, and adapted to be stretched into engagement or association with the rim, thus providing for all the desired resiliency and cushioning effect when the tire is in use.

In carrying out the invention, I also make use of certain tire sections, each of which is formed with a web adapted to be stretched and also vulcanized to the side wall of the tire, the webs virtually dividing the tire into compartments and being utilized to prevent undue lateral movement of the tire with respect to the tire carrying rim.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views and wherein:

Figure 1 is a side elevation of the tire, partly in section, showing the same associated with a tire carrying rim.

Figure 2 is an edge elevation.

Figure 3 is an enlarged fragmentary view.

Figure 4 is a transverse sectional view through the tire and tire carrying rim.

Figure 5 is a fragmentary perspective view.

Referring to the drawing in detail, the tire constructed in accordance with my invention is indicated generally at A, and the tire carrying rim indicated at B.

The tire is made up of a plurality of units 10, each of which is constructed of solid rubber possessing all the qualities embodied in rubber of the character used in tire production. Each section has a curved intermediate portion 11 and beads 12 and 13 respectively adjacent each side thereof. The beads are of relatively different lengths and define channels or groves 14. These sections 10 are arranged in face to face contact and are secured together by means of suitable ties 15, the latter being preferably constructed of wire which is arranged in the grooves 14 and have their ends secured together in any suitable manner. The ties 15 in addition to securing the units 10 together in tire formation, are also utilized to compress the units 10 so as to produce a hard rubber-like tread, although the character of the rubber is such that it is non-breakable (as hard rubber frequently is). The units 10 when secured together only provide the tread of the tire, the opposed side walls 16 each consisting of a continuous strip of suitable rubber which is vulcanized or otherwise suitably secured to the tread at points 17. Normally, the side walls 16 are comparatively short, but when applying the tire to the rim B, these side walls 16 are stretched to approximately twice their original length, and secured to the rim B in any suitable manner, such as indicated at 18. A hollow tire is thus formed, and derives its resiliency and cushioning effect from the side walls 16 which are expansible and contractible, the tire as a whole possessing all the qualities and resiliency possessed by a pneumatic tire, and at the same time eliminating the use of the pneumatic tube or any substitute therefor. In the production of the tire use is made of a number of sections 19, these sections being identical in construction with the sections 10 above described, excepting each section 19 carries a web 20. These webs are arranged within the tire and are also stretched similarly to the side walls 16, and the opposed parallel edges of each web is vulcanized or otherwise suitably secured to the adjacent sides 16. Any number of sections 19 may be utilized in a single tire, this of course depending upon the particular use to which the tire is to be put. The webs 20 afford the tire the desired strength and rigidity, and especially obviates undue lateral strain or movement of the tire with respect to the rim B, incident to skidding or the like. It is of course understood that the thickness of the sections 10 constituting the tread, as well as the dimensions of the side walls 16 and webs 20 can be varied as the occasion may require without departing from the spirit of the invention.

While it is believed that from the foregoing description that the nature and advantages of the invention will be readily apparent, I desire to have it understood that I do not limit myself to what is herein shown and described, and that such changes may be resorted to when desired as fall within the scope of what is claimed.

What I claim is:

1. A tire comprising a plurality of identically formed units arranged in face to face contact and tied together, and constituting the tread of the tire, and side walls projecting from said tread and adapted to be stretched into engagement with a tire carrying rim.

2. A tire comprising a plurality of units arranged in face to face contact and constituting the tread of the tire, means for securing said units together and holding the latter compressed, side walls projecting from said tread and adapted to be stretched into engagement with a tire carrying rim, and means arranged within the tire and connecting said walls at spaced points.

3. A tire comprising a plurality of units arranged in face to face contact and constituting the tread of the tire, means for securing said units together and holding the latter compressed, side walls projecting from said tread and adapted to be stretched into engagement with a tire carrying rim, and webs projecting from certain units and connecting said side walls, said webs being stretched prior to their engagement with said side walls.

4. A tire comprising a plurality of units arranged in face to face contact and constituting the tread of the tire, said units being formed to unitedly define continuous grooves about the periphery of the tire, tying elements arranged in said grooves for holding the units together and compressing the same, side walls projecting from said tread and adapted to be stretched into engagement with a tire carrying rim, and means within the tire for connecting the side walls at spaced points.

In testimony whereof I affix my signature.

MANUEL CHARLES.